(12) United States Patent
Cantwell et al.

(10) Patent No.: US 11,987,690 B2
(45) Date of Patent: May 21, 2024

(54) FATTY ACID-MODIFIED VEGETABLE OILS IN RUBBER COMPOSITIONS AND TIRES

(71) Applicant: The Goodyear Tire & Rubber Company, Akron, OH (US)

(72) Inventors: Kelsey Elizabeth Cantwell, Akron, OH (US); Joseph John Kulig, Tallmadge, OH (US)

(73) Assignee: THE GOODYEAR TIRE & RUBBER COMPANY, Akron, OH (US)

( * ) Notice: Subject to any disclaimer, the term of this patent is extended or adjusted under 35 U.S.C. 154(b) by 733 days.

(21) Appl. No.: 17/160,472

(22) Filed: Jan. 28, 2021

(65) Prior Publication Data

US 2022/0235195 A1    Jul. 28, 2022

(51) Int. Cl.
| | | |
|---|---|---|
| *C08K 5/09* | (2006.01) | |
| *B60C 1/00* | (2006.01) | |
| *C08K 5/1515* | (2006.01) | |
| *C08L 19/00* | (2006.01) | |

(52) U.S. Cl.
CPC .............. *C08K 5/09* (2013.01); *B60C 1/0016* (2013.01); *C08K 5/1515* (2013.01); *C08L 19/00* (2013.01)

(58) Field of Classification Search
CPC ...... C08K 5/09; C08K 5/1515; B60C 1/0016; C08L 19/00
See application file for complete search history.

(56) References Cited

U.S. PATENT DOCUMENTS

| | | | |
|---|---|---|---|
| 3,476,826 A | 11/1969 | Millen | |
| 4,039,586 A | 8/1977 | Shasha et al. | |
| 4,512,926 A | 4/1985 | Kampf et al. | |
| 5,395,891 A | 3/1995 | Obrecht et al. | |
| 5,512,190 A | 4/1996 | Anderson et al. | |
| 5,672,639 A | 9/1997 | Corvasce et al. | |
| 6,127,488 A | 10/2000 | Obrecht et al. | |
| 6,133,364 A | 10/2000 | Obrecht et al. | |
| 6,207,757 B1 | 3/2001 | Obrecht et al. | |
| 6,242,534 B1 | 6/2001 | Obrecht et al. | |
| 6,359,046 B1 | 3/2002 | Cruse | |
| 6,372,857 B1 | 4/2002 | Obrecht et al. | |
| 6,448,318 B1 | 9/2002 | Sandstrom | |
| 6,608,125 B2 | 8/2003 | Cruse et al. | |
| 7,521,401 B2 | 4/2009 | Rowland | |
| 8,084,631 B2 | 12/2011 | Roh et al. | |
| 8,308,975 B2 | 11/2012 | Roh et al. | |
| 9,238,588 B2 | 1/2016 | Harrington et al. | |
| 9,550,850 B2 | 1/2017 | Sato et al. | |
| 10,005,857 B2 | 6/2018 | Kloppenburg et al. | |
| 2003/0130535 A1 | 7/2003 | Deschler et al. | |
| 2006/0235120 A1 | 10/2006 | Saiki et al. | |
| 2007/0100061 A1 | 5/2007 | Yin et al. | |
| 2009/0076279 A1 | 3/2009 | Rowland et al. | |
| 2009/0292054 A1 | 11/2009 | Omura et al. | |
| 2010/0083871 A1 | 4/2010 | Narayan et al. | |
| 2014/0135437 A1 | 5/2014 | Sandstrom et al. | |
| 2014/0335032 A1 | 11/2014 | Panandiker et al. | |
| 2014/0335167 A1 | 11/2014 | Panandiker et al. | |
| 2015/0166701 A1 | 6/2015 | Chisholm et al. | |
| 2022/0235206 A1 | 7/2022 | Cantwell et al. | |

FOREIGN PATENT DOCUMENTS

| | | |
|---|---|---|
| CN | 105837796 A | 8/2016 |
| CN | 105713700 B | 8/2018 |
| GB | 455779 A | 10/1936 |
| JP | 2007262197 A | 10/2007 |
| JP | 2014177431 A | 9/2014 |
| WO | 2020016439 A1 | 1/2020 |

OTHER PUBLICATIONS

European Search Report for Serial No. EP22152347 mailed Jun. 30, 2022.
Bhaumik et al., Rapid Transformation of Alkyl Halides into Symmetrical Disulfides Using Sodium Sulfide and Carbon Disulfide, SynOpen, 1, 2017, pp. 117-120, Georg Thieme Verlag Stuttgart, New York.
Ionescu et al., Functionalized vegetable oils as precursors for polymers by thiol-ene reaction, European Polymer Journal 67, 2015, pp. 439-448, Elsevier Ltd.
Kuhlmann et al., Cysteine-Functional Polymers via Thiol-ene Conjugation, Macromol. Rapid Commun., 2015, 472-476, 36, WILEY-VCH Verlag Gmbh & Co. KGaA, Weinheim.
Li et al., Modified soybean oil-extended SBR compounds and vulcanizates filled with carbon black, Polymer, Jan. 13, 2015, pp. 144-156, 60, Elsevier Ltd.
Mehta et al., Moderate Temperature Curing of Plant Oils with Bismaleimides via the Ene Reaction, Ind. Eng. Chem. Res., Oct. 13, 2016, https://pubs.acs.org/doi/pdf/10.1021/acs.iecr.6b03004, 55, 45, American Chemical Society.
Nalawade et al., Modified soybean oil as a reactive diluent: coating performance, Journal of Coatings Technology and Research, Jun. 11, 2015, pp. 1005-1021, 12, American Coatings Association.
Nalawade et al., Modified soybean oil as a reactive diluent: Synthesis and characterization, Polymer Chemistry, Aug. 24, 2014, Journal of Polymer Science.
Shibata et al., High Performance Bio-Based Thermosetting Resins Composed of Tung Oil and Bismaleimide, Journal of Applied Polymer Science, Feb. 5, 2010, pp. 896-901, 119(2), Wiley Periodicals, Inc.
Shibata et al., High-performance bio-based bismaleimide resins using succinic acid and eugenol, Polymer Journal, Sep. 14, 2011, pp. 916-922, 43, The Society of Polymer Science, Japan.
Yoon et al., Self-Healing Polymer Films Based on Thiol-Disulfide Exchange Reactions and Self-Healing Kinetics Measured Using Atomic Force Microscopy, Macromolecules, Dec. 16, 2011, pp. 142-149, 45, 1, American Chemical Society.
Translation of Chinese search report for Serial No. 202210106176.X mailed Nov. 30, 2022.

*Primary Examiner* — Angela C Scott
(74) *Attorney, Agent, or Firm* — Mandy B. Willis

(57) ABSTRACT

The present invention is directed to the use of modified vegetable oils in rubber compositions and in tires.

6 Claims, No Drawings

FATTY ACID-MODIFIED VEGETABLE OILS IN RUBBER COMPOSITIONS AND TIRES

BACKGROUND

Oils are added to rubber compounds to aid in processing during mixing and to improve performance of the rubber compound as a component in a tire. For example, various oils may improve traction and/or handling, dry grip and wet grip.

Ever more sophisticated rubber compositions including high filler contents, high molecular weight elastomers and functional elastomer require improved processing aids such as oils to improve processing and to improve tire performance.

SUMMARY

The present invention is directed to a rubber composition comprising a vegetable oil derivative comprising the structure

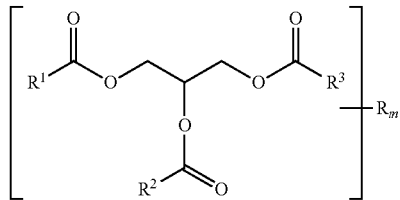

where $R^1$, $R^2$ and $R^3$ are independently C15-C20 alkenyl, C15-C20 alkyl, and optionally containing aromatic groups; R is —O—C(═O)—$R^4$ where $R^4$ is C15-C20 alkenyl; each R is covalently bonded to a first carbon atom of one of $R^1$, $R^2$ or $R^3$ wherein a second carbon atom is adjacent to the first carbon atom and the second carbon atom is substituted with an —OH group; and m is the number of R groups.

The invention is further directed to a pneumatic tire comprising the rubber composition.

DESCRIPTION

There is disclosed a rubber composition comprising a vegetable oil derivative comprising the structure

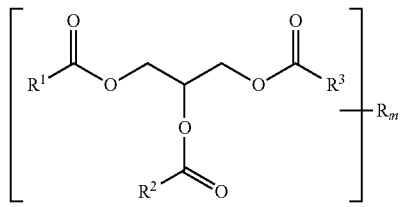

where $R^1$, $R^2$ and $R^3$ are independently C15-C20 alkenyl, C15-C20 alkyl, and optionally containing aromatic groups; R is —O—C(═O)—$R^4$ where $R^4$ is C15-C20 alkenyl; each R is covalently bonded to a first carbon atom of one of $R^1$, $R^2$ or $R^3$ wherein a second carbon atom is adjacent to the first carbon atom and the second carbon atom is substituted with an —OH group; and m is the number of R groups.

The vegetable oil derivative may be produced by modification of an epoxidized vegetable oil.

In one embodiment, the number of R groups m ranges from 1 to 5.

In one embodiment, wherein R is selected from the group consisting of oleate, linoleate, and linolenate groups.

In one embodiment, each of $R^1$, $R^2$, and $R^3$ are independently at least one member selected from the group consisting of stearyl, palymityl, oleyl, linoleyl, and linolenyl groups.

In one embodiment, the vegetable oil derivative is the reaction product of an unsaturated fatty acid and an epoxidized vegetable oil.

In this embodiment, the epoxidized vegetable oil is selected from the group consisting of epoxidized soybean oil, epoxidized canola oil, epoxidized castor oil, epoxidized palm oil, epoxidized sunflower oil, epoxidized coconut oil, and epoxidized corn oil.

In this embodiment, the unsaturated fatty acid is at least one member selected from the group consisting of oleic acid, linoleic acid, and linolenic acid.

The vegetable oil derivative may be used in a vulcanizable rubber composition. In one embodiment, the vegetable oil derivative is used in an amount ranging from 1 to 80 phr.

The rubber composition may include, in addition to the vegetable oil derivative, one or more rubbers or elastomers containing olefinic unsaturation. The phrases "rubber or elastomer containing olefinic unsaturation" or "diene based elastomer" are intended to include both natural rubber and its various raw and reclaim forms as well as various synthetic rubbers. In the description of this invention, the terms "rubber" and "elastomer" may be used interchangeably, unless otherwise prescribed. The terms "rubber composition," "compounded rubber" and "rubber compound" are used interchangeably to refer to rubber which has been blended or mixed with various ingredients and materials and such terms are well known to those having skill in the rubber mixing or rubber compounding art. Representative synthetic polymers are the homopolymerization products of butadiene and its homologues and derivatives, for example, methylbutadiene, dimethylbutadiene and pentadiene as well as copolymers such as those formed from butadiene or its homologues or derivatives with other unsaturated monomers. Among the latter are acetylenes, for example, vinyl acetylene; olefins, for example, isobutylene, which copolymerizes with isoprene to form butyl rubber; vinyl compounds, for example, acrylic acid, acrylonitrile (which polymerize with butadiene to form NBR), methacrylic acid and styrene, the latter compound polymerizing with butadiene to form SBR, as well as vinyl esters and various unsaturated aldehydes, ketones and ethers, e.g., acrolein, methyl isopropenyl ketone and vinylethyl ether. Specific examples of synthetic rubbers include neoprene (polychloroprene), polybutadiene (including cis-1,4-polybutadiene), polyisoprene (including cis-1,4-polyisoprene), butyl rubber, halobutyl rubber such as chlorobutyl rubber or bromobutyl rubber, styrene/isoprene/butadiene rubber, copolymers of 1,3-butadiene or isoprene with monomers such as styrene, acrylonitrile and methyl methacrylate, as well as ethylene/propylene terpolymers, also known as ethylene/propylene/diene monomer (EPDM), and in particular, ethylene/propylene/dicyclopentadiene terpolymers. Additional examples of rubbers which may be used include alkoxy-silyl end functionalized solution polymerized polymers (SBR, PBR, IBR and SIBR), silicon-coupled and tin-coupled star-branched polymers. The preferred rubber or elastomers are polyisoprene (natural or synthetic), polybutadiene and SBR.

In one aspect the at least one additional rubber is preferably of at least two of diene based rubbers. For example, a combination of two or more rubbers is preferred such as cis 1,4-polyisoprene rubber (natural or synthetic, although natural is preferred), 3,4-polyisoprene rubber, styrene/isoprene/butadiene rubber, emulsion and solution polymerization derived styrene/butadiene rubbers, cis 1,4-polybutadiene rubbers and emulsion polymerization prepared butadiene/acrylonitrile copolymers.

In one aspect of this invention, an emulsion polymerization derived styrene/butadiene (E-SBR) might be used having a relatively conventional styrene content of about 20 to about 28 percent bound styrene or, for some applications, an E-SBR having a medium to relatively high bound styrene content, namely, a bound styrene content of about 30 to about 45 percent.

By emulsion polymerization prepared E-SBR, it is meant that styrene and 1,3-butadiene are copolymerized as an aqueous emulsion. Such are well known to those skilled in such art. The bound styrene content can vary, for example, from about 5 to about 50 percent. In one aspect, the E-SBR may also contain acrylonitrile to form a terpolymer rubber, as E-SBAR, in amounts, for example, of about 2 to about 30 weight percent bound acrylonitrile in the terpolymer.

Emulsion polymerization prepared styrene/butadiene/acrylonitrile copolymer rubbers containing about 2 to about 40 weight percent bound acrylonitrile in the copolymer are also contemplated as diene based rubbers for use in this invention.

The solution polymerization prepared SBR (S-SBR) typically has a bound styrene content in a range of about 5 to about 50, preferably about 9 to about 36, percent. The S-SBR can be conveniently prepared, for example, by organo lithium catalyzation in the presence of an organic hydrocarbon solvent.

In one embodiment, cis 1,4-polybutadiene rubber (BR) may be used. Such BR can be prepared, for example, by organic solution polymerization of 1,3-butadiene. The BR may be conveniently characterized, for example, by having at least a 90 percent cis 1,4-content.

The cis 1,4-polyisoprene and cis 1,4-polyisoprene natural rubber are well known to those having skill in the rubber art.

The term "phr" as used herein, and according to conventional practice, refers to "parts by weight of a respective material per 100 parts by weight of rubber, or elastomer."

The rubber composition may also include up to 70 phr of processing oil. Processing oil may be included in the rubber composition as extending oil typically used to extend elastomers. Processing oil may also be included in the rubber composition by addition of the oil directly during rubber compounding. The processing oil used may include both extending oil present in the elastomers, and process oil added during compounding. Suitable process oils include various oils as are known in the art, including aromatic, paraffinic, naphthenic, vegetable oils, and low PCA oils, such as MES, TDAE, SRAE and heavy naphthenic oils. Suitable low PCA oils include those having a polycyclic aromatic content of less than 3 percent by weight as determined by the IP346 method. Procedures for the IP346 method may be found in *Standard Methods for Analysis & Testing of Petroleum and Related Products* and *British Standard* 2000 *Parts,* 2003, 62nd edition, published by the Institute of Petroleum, United Kingdom.

The rubber composition may include from about 10 to about 150 phr of silica. In another embodiment, from 20 to 80 phr of silica may be used.

The commonly employed siliceous pigments which may be used in the rubber compound include conventional pyrogenic and precipitated siliceous pigments (silica). In one embodiment, precipitated silica is used. The conventional siliceous pigments employed in this invention are precipitated silicas such as, for example, those obtained by the acidification of a soluble silicate, e.g., sodium silicate.

Such conventional silicas might be characterized, for example, by having a BET surface area, as measured using nitrogen gas. In one embodiment, the BET surface area may be in the range of about 40 to about 600 square meters per gram. In another embodiment, the BET surface area may be in a range of about 80 to about 300 square meters per gram. The BET method of measuring surface area is described in the *Journal of the American Chemical Society*, Volume 60, Page 304 (1930).

The conventional silica may also be characterized by having a dibutylphthalate (DBP) absorption value in a range of about 100 to about 400, alternatively about 150 to about 300.

The conventional silica might be expected to have an average ultimate particle size, for example, in the range of 0.01 to 0.05 micron as determined by the electron microscope, although the silica particles may be even smaller, or possibly larger, in size.

Various commercially available silicas may be used, such as, only for example herein, and without limitation, silicas commercially available from PPG Industries under the Hi-Sil trademark with designations 210, 243, etc; silicas available from Rhodia, with, for example, designations of Z1165MP and Z165GR and silicas available from Degussa AG with, for example, designations VN2 and VN3, etc.

Commonly employed carbon blacks can be used as a conventional filler in an amount ranging from 10 to 150 phr. In another embodiment, from 20 to 80 phr of carbon black may be used. Representative examples of such carbon blacks include N110, N121, N134, N220, N231, N234, N242, N293, N299, N315, N326, N330, N332, N339, N343, N347, N351, N358, N375, N539, N550, N582, N630, N642, N650, N683, N754, N762, N765, N774, N787, N907, N908, N990 and N991. These carbon blacks have iodine absorptions ranging from 9 to 145 g/kg and DBP number ranging from 34 to 150 $cm^3$/100 g.

Other fillers may be used in the rubber composition including, but not limited to, particulate fillers including ultra-high molecular weight polyethylene (UHMWPE), crosslinked particulate polymer gels including but not limited to those disclosed in U.S. Pat. Nos. 6,242,534; 6,207,757; 6,133,364; 6,372,857; 5,395,891; or 6,127,488, and plasticized starch composite filler including but not limited to that disclosed in U.S. Pat. No. 5,672,639. Such other fillers may be used in an amount ranging from 1 to 30 phr.

In one embodiment, the rubber composition may contain a conventional sulfur containing organosilicon compound. In one embodiment, the sulfur containing organosilicon compounds are the 3,3'-bis(trimethoxy or triethoxy silylpropyl) polysulfides. In one embodiment, the sulfur containing organosilicon compounds are 3,3'-bis(triethoxysilylpropyl) disulfide and/or 3,3'-bis(triethoxysilylpropyl) tetrasulfide.

In another embodiment, suitable sulfur containing organosilicon compounds include compounds disclosed in U.S. Pat. No. 6,608,125. In one embodiment, the sulfur containing organosilicon compounds includes 3-(octanoylthio)-1-propyltriethoxysilane, $CH_3(CH_2)_6C(=O)-S-CH_2CH_2CH_2Si(OCH_2CH_3)_3$, which is available commercially as NXT™ from Momentive Performance Materials.

In another embodiment, suitable sulfur containing organosilicon compounds include those disclosed in U.S.

Patent Publication No. 2003/0130535. In one embodiment, the sulfur containing organosilicon compound is Si-363 from Degussa.

The amount of the sulfur containing organosilicon compound in a rubber composition will vary depending on the level of other additives that are used. Generally speaking, the amount of the compound will range from 0.5 to 20 phr. In one embodiment, the amount will range from 1 to 10 phr.

It is readily understood by those having skill in the art that the rubber composition would be compounded by methods generally known in the rubber compounding art, such as mixing the various sulfur-vulcanizable constituent rubbers with various commonly used additive materials such as, for example, sulfur donors, curing aids, such as activators and retarders and processing additives, such as oils, resins including tackifying resins and plasticizers, fillers, pigments, fatty acid, zinc oxide, waxes, antioxidants and antiozonants and peptizing agents. As known to those skilled in the art, depending on the intended use of the sulfur vulcanizable and sulfur-vulcanized material (rubbers), the additives mentioned above are selected and commonly used in conventional amounts. Representative examples of sulfur donors include elemental sulfur (free sulfur), an amine disulfide, polymeric polysulfide and sulfur olefin adducts. In one embodiment, the sulfur-vulcanizing agent is elemental sulfur. The sulfur-vulcanizing agent may be used in an amount ranging from 0.5 to 8 phr, alternatively with a range of from 1.5 to 6 phr. Typical amounts of tackifier resins, if used, comprise about 0.5 to about 10 phr, usually about 1 to about 5 phr. Typical amounts of processing aids comprise about 1 to about 50 phr. Typical amounts of antioxidants comprise about 1 to about 5 phr. Representative antioxidants may be, for example, diphenyl-p-phenylenediamine and others, such as, for example, those disclosed in *The Vanderbilt Rubber Handbook* (1978), Pages 344 through 346. Typical amounts of antiozonants comprise about 1 to 5 phr. Typical amounts of fatty acids, if used, which can include stearic acid comprise about 0.5 to about 3 phr. Typical amounts of zinc oxide comprise about 2 to about 5 phr. Typical amounts of waxes comprise about 1 to about 5 phr. Often microcrystalline waxes are used. Typical amounts of peptizers comprise about 0.1 to about 1 phr. Typical peptizers may be, for example, pentachlorothiophenol and dibenzamidodiphenyl disulfide.

Accelerators are used to control the time and/or temperature required for vulcanization and to improve the properties of the vulcanizate. In one embodiment, a single accelerator system may be used, i.e., primary accelerator. The primary accelerator(s) may be used in total amounts ranging from about 0.5 to about 4, alternatively about 0.8 to about 1.5, phr. In another embodiment, combinations of a primary and a secondary accelerator might be used with the secondary accelerator being used in smaller amounts, such as from about 0.05 to about 3 phr, in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are amines, disulfides, guanidines, thioureas, thiazoles, thiurams, sulfenamides, dithiocarbamates and xanthates. In one embodiment, the primary accelerator is a sulfenamide. If a second accelerator is used, the secondary accelerator may be a guanidine, dithiocarbamate or thiuram compound.

The mixing of the rubber composition can be accomplished by methods known to those having skill in the rubber mixing art. For example, the ingredients are typically mixed in at least two stages, namely, at least one non-productive stage followed by a productive mix stage. The final curatives including sulfur-vulcanizing agents are typically mixed in the final stage which is conventionally called the "productive" mix stage in which the mixing typically occurs at a temperature, or ultimate temperature, lower than the mix temperature(s) than the preceding non-productive mix stage(s). The terms "non-productive" and "productive" mix stages are well known to those having skill in the rubber mixing art. The rubber composition may be subjected to a thermomechanical mixing step. The thermomechanical mixing step generally comprises a mechanical working in a mixer or extruder for a period of time suitable in order to produce a rubber temperature between 140° C. and 190° C. The appropriate duration of the thermomechanical working varies as a function of the operating conditions, and the volume and nature of the components. For example, the thermomechanical working may be from 1 to 20 minutes.

The rubber composition may be incorporated in a variety of rubber components of the tire. For example, the rubber component may be a tread (including tread cap and tread base), sidewall, apex, chafer, sidewall insert, wirecoat or innerliner. In one embodiment, the component is a tread.

Alternatively, the rubber composition may be used in various manufactured items including but not limited to tire treads, shoes, shoe soles, transmission belts, hoses, airsprings, conveyor belts, track belts, and vibration isolators.

The pneumatic tire of the present invention may be a race tire, passenger tire, aircraft tire, agricultural, earthmover, off-the-road, truck tire, and the like. In one embodiment, the tire is a passenger or truck tire. The tire may also be a radial or bias.

Vulcanization of the pneumatic tire of the present invention is generally carried out at conventional temperatures ranging from about 100° C. to 200° C. In one embodiment, the vulcanization is conducted at temperatures ranging from about 110° C. to 180° C. Any of the usual vulcanization processes may be used such as heating in a press or mold, heating with superheated steam or hot air. Such tires can be built, shaped, molded and cured by various methods which are known and will be readily apparent to those having skill in such art.

This invention is illustrated by the following examples that are merely for the purpose of illustration and are not to be regarded as limiting the scope of the invention or the manner in which it can be practiced. Unless specifically indicated otherwise, parts and percentages are given by weight.

EXAMPLES

General Experimental

A sample of epoxidized soybean oil (ESBO) was obtained from Arkema as Vikoflex 7170 and analyzed by 1H NMR to determine the exact epoxide count per molecule, so reagents could be calculated for the intended reactions. Each triglyceride molecule had an average of 4.2 epoxides each and no olefin content was detected. Oleic acid was obtained from Sigma Aldrich, and 1,4-diazabicyclo[2.2.2]octane (DABCO, also known as triethylenediamine) was obtained from Beantown Chemical. All reagents were used without further purification.

Example 1

General Procedure for Epoxidized Soybean Oil Ring-Opening 400-800 g (1 equivalent) of epoxidized soybean oil (ESBO) was weighed into a resin kettle, followed by 1-4.2 equivalents of the desired carboxylic acid. The mixture was stirred prior to DABCO (1-3.5 wt % versus ESBO) being added. The mixture was heated at 120-150° C. for 3-4 h. After the reaction was complete, the reaction vessel was carefully opened to high vacuum while still being heated to remove the DABCO by sublimation. The resultant product was subjected to 1H and 13C NMR to confirm identity and purity. The product was used without further purification.

Example 2

Synthesis of Soy-4-Oleic

To a 2 L resin kettle was added ESBO (440 g, 463.2 mmol, 1 equivalents), oleic acid (722 mL, 2047.6 mmol, 4.2 equivalents), and DABCO (15.4 g, 3.5 wt %). The resin kettle was flushed with $N_2$ and heated to 120-150° C. for 3-4 hours to allow for complete reaction. The resin kettle was opened to vacuum while hot for several hours to sublime/remove the DABCO from the product. The product was transferred hot into appropriate containers for storage. The $^1$H NMR of the product showed that there were 4.2 oleate groups per triglyceride.

Example 3

Three rubber compounds were prepared in a multistep mix procedure following the formulations in Table 1, where all amounts are in phr. Rubber compounds were cured following a standard cure cycle and tested for various properties as given in Table 2.

TABLE 1

| Sample No. | A | B | C |
|---|---|---|---|
| Type | Cont | Comp | Inv |
| Polymer[1] | 100 | 100 | 100 |
| Silica[2] | 65 | 65 | 65 |
| Naphthenic Oil[3],* | 20 | 10 | 10 |
| Soybean Oil[4] | 0 | 10 | 0 |
| Soy-4-Oleic Acid | 0 | 0 | 10 |
| Silane Coupling Agent[5] | 5.2 | 5.2 | 5.2 |
| Additives[6] | 11.5 | 11.5 | 11.5 |
| Sulfur[7] | 1.7 | 1.7 | 1.7 |
| Curatives[8] | 3.9 | 3.9 | 3.9 |

[1]Styrene butadiene rubber and polybutadiene
[2]Precipitated silica from Solvay, Zeosil 1165MP ™
[3]Naphthenic oil supplied by Cross Oil Refining & Marketing, Cross Corsol 100, heavy naphthenic process oil.
[4]Soybean oil as Sterling Oil from Stratus Food Company or Master Chef Soybean Oil 22393 from Cargill
[5]Bis-(3-triethoxysilylpropyl)disulfide, trade name Si 266 ®, from Evonik Industries
[6]Combination of fatty acids (stearic, palmitic, and oleic), carbon black from Tokai Carbon, and waxes (microcrystalline and/or paraffinic)
[7]Elemental sulfur from "Siarkopol" Tarnobrzeg Chemical Plants LTD.
[8]Diphenyl guanidine and sulfenamide sulfur cure accelerators Results and Discussion

TABLE 2

| Sample No. | A | B | C |
|---|---|---|---|
| Processing Tensile | 100 | 106 | 114 |
| Elongation at break | 100 | 122 | 103 |
| Modulus 300% | 100 | 84 | 99 |
| Tear | 100 | 115 | 77 |
| Wear | 100 | 97 | 66 |
| Wet | 100 | 96 | 96 |
| Handling | 100 | 98 | 118 |
| Rolling Resistance | 100 | 92 | 115 |
| Winter | 100 | 117 | 114 |

*Data normalized to naphthenic control to indicate percent improvement

Soy-4-Oleic Acid shows many improvements with only two tradeoffs—tear and abrasion resistance. Wet performance is retained while improving winter performance compared to naphthenic and soybean oil controls, which has been a key tradeoff pursued in the tire industry for decades. Soybean oil is known to be a better plasticizer than naphthenic oil. In this example, the tensile properties for Soy-4-Oleic Acid are nearly identical to those of naphthenic oil, while the uncured G' indicator for processing shows that Soy-4-Oleic Acid is a better plasticizer than soybean oil. Abrasion resistance and tear indicators are reduced for Soy-4-Oleic acid, but these properties can be adjusted through compounding methods to those skilled in the art. Handling indicators for Soy-4-Oleic Acid also show dramatic improvement versus the controls.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. A vulcanizable rubber composition comprising a vegetable oil derivative comprising the structure

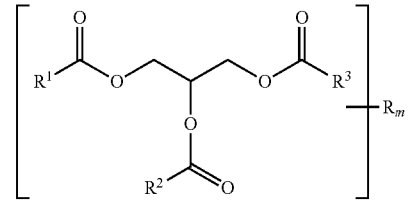

where $R^1$, $R^2$ and $R^3$ are independently C15-C20 alkenyl, C15-C20 alkyl, and optionally containing aromatic groups; R is —O—C(=O)—$R^4$ where $R^4$ is C15-C20 alkenyl; each R is covalently bonded to a first carbon atom of one of $R^1$, $R^2$ or $R^3$ wherein a second carbon atom is adjacent to the first carbon atom and the second carbon atom is substituted with an —OH group; and m is the number of R groups.

2. The vulcanizable rubber composition of claim 1 wherein m ranges from 1 to 5.

3. The vulcanizable rubber composition of claim 1 wherein R is selected from the group consisting of oleate, linoleate, and linolenate groups.

4. The vulcanizable rubber composition of claim 1 wherein each of $R^1$, $R^2$, and $R^3$ are independently at least one member selected from the group consisting of stearyl, palymityl, oleyl, linoleyl, and linolenyl groups.

5. A pneumatic tire comprising the vulcanizable rubber composition of claim 1.

6. A manufactured item comprising the vulcanizable rubber composition of claim 1 wherein the manufactured item is selected from the group consisting of tire treads, shoes, shoe soles, transmission belts, hoses, airsprings, conveyor belts, track belts, and vibration isolators.

\* \* \* \* \*